J. C. MORRIS.
Wood-Bending Machines.
No. 1,312. Reissued May 27, 1862.
Fig. 1.
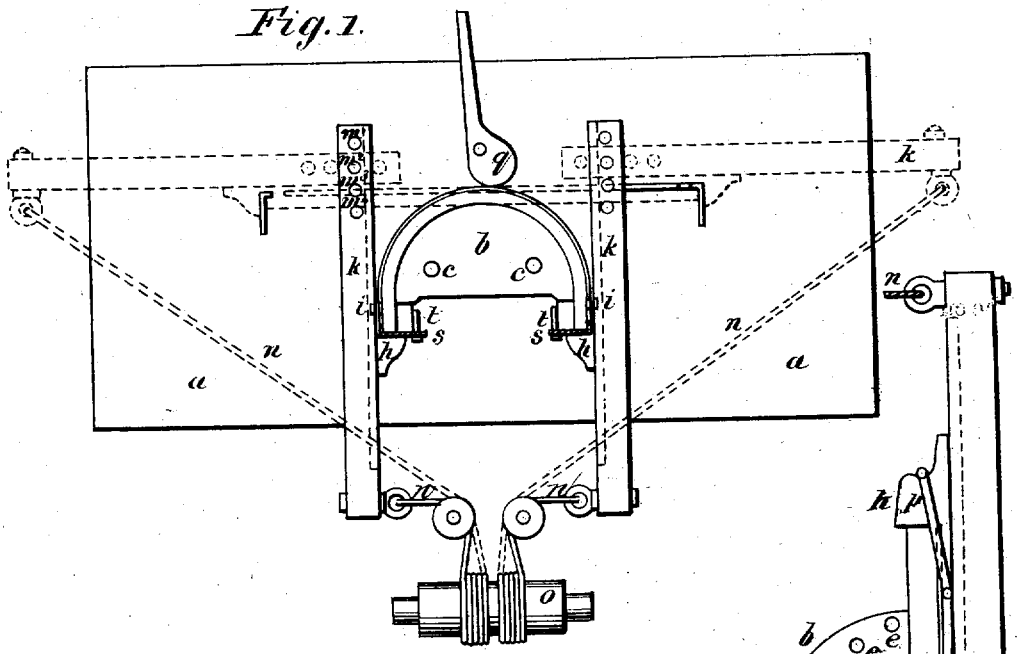
Fig. 5.
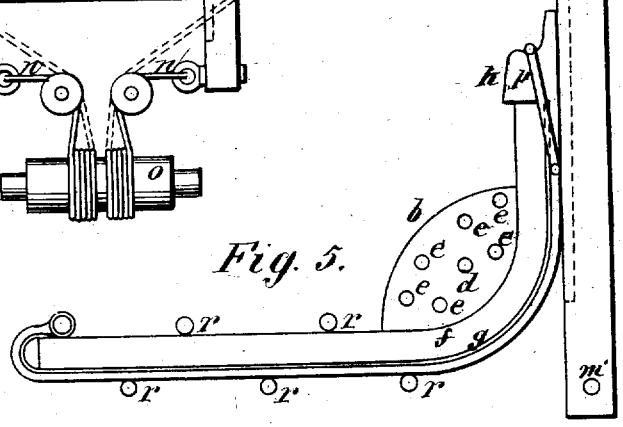
Fig. 7.
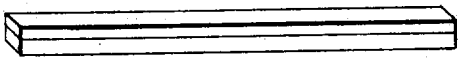
Fig. 6.
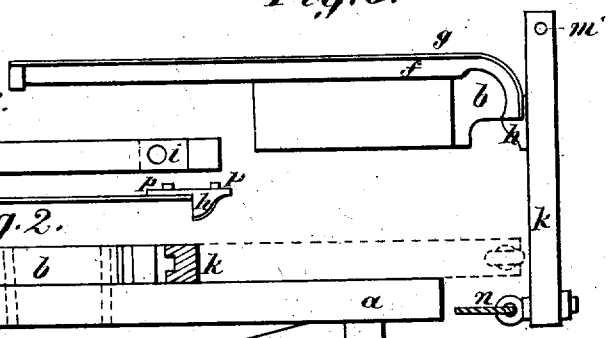
Fig. 3.
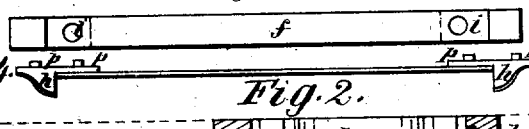
Fig. 4.
Fig. 2.
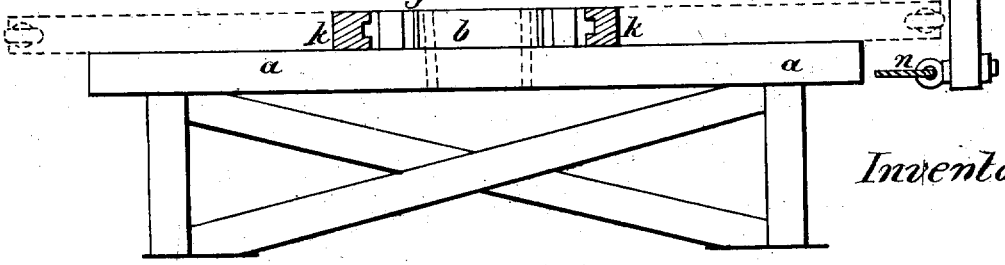
Inventor
Witnesses
N. PETERS. Photo-Lithographer. Washington, D. C.

UNITED STATES PATENT OFFICE.

JOHN C. MORRIS, OF CINCINNATI, OHIO.

IMPROVEMENT IN WOOD-BENDING MACHINES.

Specification forming part of Letters Patent No. 14,405, dated March 11, 1856; Reissue No. 1,312, dated May 27, 1862.

*To all whom it may concern:*

Be it known that I, JOHN C. MORRIS, of the city of Cincinnati, Hamilton county, Ohio, have invented certain new and useful improvements in machines for bending wood for wagon-fellies, ship-timber, plow-handles, chair stuff, and for all other purposes for which bent wood is required; and I do hereby declare that the following is a full, clear, and exact description thereof, reference being had to the accompanying drawings, forming part of this specification, and to the letters of reference marked thereon.

Similar letters refer to corresponding parts.

The machines for bending wood may be divided into two principal groups or classes. The first including all machines in which the bending process commences at one end of the wood and is continued in the direction of the other, and the second including those in which the form or mold is first applied at or near the center of the piece to be bent, and the bending process is continued from that point toward each end, which I call "bending outward." I regard machines of the latter class as superior, from the fact that the change of the fiber of the wood in the act of bending goes on from the center toward the ends in two directions, equalizing the strain and distributing the compressed fiber more evenly throughout the curve.

My improvements relate to this second class of machines.

In my original patent, of which this is a reissue, reference was made to a previous use of levers "for bringing the piece to the required shape, by connecting said levers with a strap at each end, the strap being placed at the back of the piece required to be bent, and then drawing the ends of the levers together, which bends the piece around the form." This reference was solely to a use of such a method which had been made by myself within less than two years previous to the application for my original patent.

My improvements consist of devices tending to adapt the machines of the second class, as stated above, to the performance of good work in an expeditious manner and with the least loss of material. They are applicable to bending wood to be used for any purpose, such as ship timber, wheel fellies, plow-handles, chair stuff, and other articles. In some cases, as for bending plow-handles, but one lever will be required, when the bending process will begin at the inner end of the curve next to the portion of the piece left unbent, and will extend toward the outer end, bending the wood first in a larger curve and gradually reducing it to a smaller until it conforms to the curvature of the mold. In bending wood around a form the outer fibers are stretched while the inner ones are compressed; but while wood may be greatly compressed without injury comparatively little stretching or expansion will break the fibers of the outer curve. To prevent undue expansion, it is necessary to confine the wood between abutments placed at the ends, so as to counteract end expansion by what is called in the art "end pressure." These abutments or clamps may wholly prevent end expansion, or may prevent it before or after a certain degree of pressure is reached in the process of bending.

To enable others skilled in the art to make and use my improvements, I will proceed to describe its construction and operation by referring directly to the accompanying drawings.

Figure A represents a top view of the horizontal or vertical platform, to which the bending apparatus is attached. Fig. B is a side elevation of the same when used horizontally. Figs. C and D are two views of the bending-strap and abutments or clamps to be applied to the back and end of the piece to be bent. Figs. E and F exhibit the improvements as applied to the bending of plow-handles and boat or ship timber, or when one lever only is used.

*a a* represent the platform on which the form *b* rests. This form may be held to its place by pins *c c*, or it may be poised upon a single pin, as at *d*, Fig. E, or upon either or all of pins *e e e e e e*, so as to vary the points of support and permit the form to adapt itself to the wood under varying circumstances. The form is made of the shape in which it is desired that the piece shall be bent. The form *b* is of a shape suitable for bending wagon-fellies.

*f* represents the felly or bent wood.

*g* is an iron or steel band or bending-strap.

*h h* are clamps or abutments, to be applied at opposite ends of the piece to be bent. They are attached by pins *i i*, projecting from them, and made to pass through the strap in Fig. A, by the stirrup *p* in Fig. E, and directly to the lever in Fig. F. If all end expansion is to be prevented, the piece before bending is made to fit with substantial accuracy the space between the clamps. If it is desired to permit a slight degree of expansion, the wood may be cut a little shorter than the space between the clamps and allowed to expand, as it is bent, until it fills the space.

*k k* are levers or handles for the purpose of guiding the bending operation. They may work upon the fulcrums $m'$, $m^2$, $m^3$, or $m^4$, or their equivalents. These handles or levers support the clamps and serve to draw them, with the strap and piece to be bent, around the form or mold. They are operated by the cord *n n* and drum *o*. When the levers are thus used, the clamps or abutments connected to the strap *g* are adjusted so as to slide upon the sides of the levers, to allow the piece to be bent to accommodate itself to the form. Another mode of using the handles is to dispense with the fulcrum-pins, so that in the operation of bending, while the power is applied as before to the end of the handles and the resistance is the unbent wood, the point of support is no longer fixed, but shifting, being found on the bending-strap or point of contact of the strap and wood with the mold. In this method, which was that originally used by me, the abutments do not slide upon the handles, but may be made a part thereof or attached thereto.

The principal advantage of the fixed fulcrum is that it prevents the wood from twisting in the process of bending, by reason of one side of the wood, or one of two pieces bent at the same time, being harder than the other. In such cases, without some rigid point of support preventing the levers from twisting or turning, it is difficult to make true work.

*p p* are tongue-pins, attached or cast to the back of the abutments, which, when the latter are allowed to slide on the handles, work in grooves to prevent the clamps from slipping laterally, or otherwise becoming deranged from their proper relative position during the bending operation.

*q*, Fig. A, is an eccentric, and *r r r*, Fig. E, are pins or studs for bringing the wood and strap in close relation with the form when the bending commences, and for the purpose of confining that portion of the curve, while the piece is gradually made to conform to the mold, through the operation of the drum, cords, and handles.

Two or more pieces may be bent at the same time by laying them together, as shown in Fig. G, and placing them in the machine.

For the heavier kinds of bending, the band and other parts must be of increased strength. One of the modes of increasing the strength of a band is to double it, putting the stirrup or clevis, as shown in Fig. E, in the loop.

In Fig. E the improvements are applied to bending timber for boat and ship building, a knee for a hull being shown in the diagram. One end of the timber is held between studs, while the other is bent from the point where the curve merges into the straight part outward to the other end by means of the handle supporting the abutment. But one lever and clamp are used for this purpose, or in bending plow handles, as shown in Fig. F. In the latter drawing no means of holding the pieces in contact with the form at the commencement of the process is shown, but the eccentric *q*, stud *r*, wedge, screw, or any suitable means must be employed for that purpose.

In the use of the center bending process shown in Fig. A, as the piece is laid against the strap and between the clamps, hooks *s s*, provided with pin-holes, are placed so as to embrace the ends of the piece. After it is bent to the form, pins *t t* are inserted in the holes, thus securing the bent piece to the form. The strap and clamps are then removed from the felly, the form with the bent piece is taken from the platform, held between two pieces of timber, so that the catch-hooks and pins may be removed when a strip of wood is nailed across to prevent the ends of the piece from spreading. The form is then removed and replaced for bending another piece.

Having thus fully described my improvements, I do not wish to be understood as claiming them in connection with machines for bending wood where the bending is effected by the rotation of the form; but

What I claim therein as new, and desire to secure by Letters Patent, is—

1. A wood-bending form to which timbers are made to conform by bending them from the center or inner end of the desired curve outward, when used in combination with abutments or clamps to prevent or regulate end expansion, and levers or handles, or their equivalents, to guide the bending, substantially as described.

2. A stationary or poised wood-bending form, in combination with the cords, levers, and drum, or their equivalents, and the eccentric clamp or its equivalent, in the manner and for the purposes set forth.

3. In combination with the stationary form, levers, and abutments, the employment of hooks, or hooks and pins, or their equivalents, that shall embrace the ends of the wood to restrain the wood in shape and permit the removal of the abutments, after the completion of each operation.

JOHN C. MORRIS.

Witnesses.
J. H. BALDWIN,
JOHN CRISMAN.